April 12, 1949.    C. F. LEATHERS    2,467,321
WELDING APPARATUS

Filed Feb. 19, 1945    6 Sheets-Sheet 1

FIG. 1.

INVENTOR.
Chester F. Leathers
BY
Harness, Dickey & Pierce.
ATTORNEYS.

Fig. 5.

Patented Apr. 12, 1949

2,467,321

UNITED STATES PATENT OFFICE 2,467,321

WELDING APPARATUS

Chester F. Leathers, Detroit, Mich.

Application February 19, 1945, Serial No. 580,262

5 Claims. (Cl. 171—97)

The present invention relates to resistance welding or heating systems, and is particularly directed to the provision of an improved multiple spot welder utilizing storage batteries as a source of welding energy. In certain of its aspects, the present invention is directed to improvements upon the inventions disclosed and claimed in the copending application of Fred H. Johnson and the present applicant, Serial No. 479,998, filed March 22, 1943, now Patent 2,452,573, dated November 2, 1948, and in the copending application of the present applicant, Serial No. 435,322, filed July 17, 1944, now Patent Number 2,357,263, dated August 29, 1944.

Principal objects of the present invention are to provide an improved system of the above generally indicated type, which is simple in arrangement, economical of manufacture and assembly, efficient and reliable in operation, and which is simple and inexpensive to maintain; to provide such a system embodying one or more storage battery units as a source of welding energy, and embodying improved means for selectively connecting the source to the different groups of welding electrodes, each such group including a plurality of welding electrodes; to provide such an arrangement employing a main contactor mechanism which is common to all of the groups of electrodes, and employing additional contactor mechanisms which correspond respectively to different groups, the initiation and termination of each welding operation being accomplished by the action of the main contactor, and the selection of the group of electrodes which is to receive welding current, being accomplished by the secondary contactors; and to generally improve multiple spot welders of the battery operated type. With the above as well as other and more detailed objects in view, which appear in the following description and in the appended claims, preferred but illustrative embodiments of the invention are shown in the accompanying drawings, throughout the several views of which corresponding reference characters are used to designate corresponding parts and in which:

Fig. 6 is a view in section of an illustrative main contactor construction;

Fig. 8 is a diagrammatic view of a modification of the invention, illustrating its adaptability to different types of welding guns; and Fig. 9 is a view showing one of the guns and one of the secondary contactors employed in the system of Fig. 8.

Referring first to the embodiment of Figures 1 through 7, the illustrative welding system comprises a multiple spot welding machine, or welder 20, and a self-contained power pack or source of welding energy 22. Except in respects noted hereinafter, the welder 20 may be of generally conventional construction.

Figure 1:
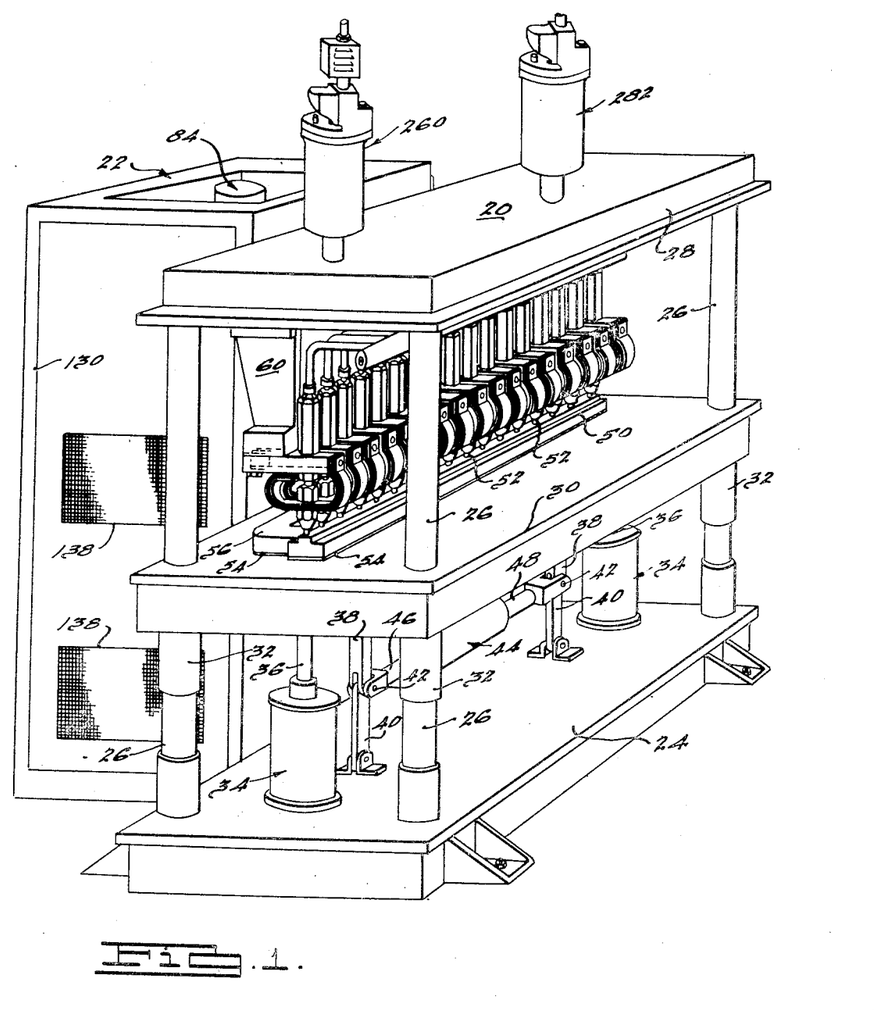
Figure 1 is a perspective view of a multiple spot welder embodying the invention.

As shown, welder 20 comprises a base structure 24, which supports a series of four columns 26. Columns 26 are surmounted by a cover structure 28, and serve as slidable guides for a work supporting table 30. More particularly, sleeves 32 are secured to the underside of table 30, and these sleeves are slidable upon the columns 26. The table 30 normally occupies a lower position in which the fixed and movable welding electrodes, described below, are relatively widely separated so as to facilitate the insertion and removal of work into and from the machine; but may be moved to an elevated position by means of a pair of spaced rams 34, the cylinders whereof are carried by the base 24, and the piston rods 36 whereof are connected to the table 30. Rams 34 may be operated by either hydraulic fluid such as oil, or an elastic fluid such as air. In order to positively hold the table 30 in its elevated position, it is preferred to provide toggle mechanism, which is shown as comprising two pairs of links 38—40. The links of each pair are pivotally connected by pins 42, and the respective pairs are interconnected by a contractable and extensible link 44 which may and preferably does embody a fluid pressure operated ram. The cylinder of this ram may be connected to, for example, the arm portion 46, while the piston rod of this ram may be connected to or may comprise the arm portion 48. As will be understood, a shortening of the link 44 breaks the toggle, enabling the table 30 to be lowered. When the table 30 is elevated to its illustrated position, by means of the rams 34, link 44 may be extended so as to straighten the toggle and enable the pairs of links 38—40 to positively support the table in the illustrative upper or welding position. In the latter position, the fixed and movable welding electrodes may be only slightly spaced apart or, and preferably, may be lightly engaged with each other.

As shown, table 30 forms a support for a bus bar 50, formed of good conductive material, such as copper, or an alloy thereof, and which bus bar is common to all of a plurality of relatively movable electrodes 52, which movable electrodes 52 are divided into different groups, as is described in more detail in connection with Figure 4. Bus bar 50 is insulated from table 30 in conventional fashion, as by means of the interposed insulating material 54. Bus bar 50 is also integrally, or otherwise rigidly, connected to a cooperating bus bar 56, which, as is described in connection with Figure 5, extends through a current regulating rheostat mechanism, to one terminal of the power pack 22.

Figure 5:
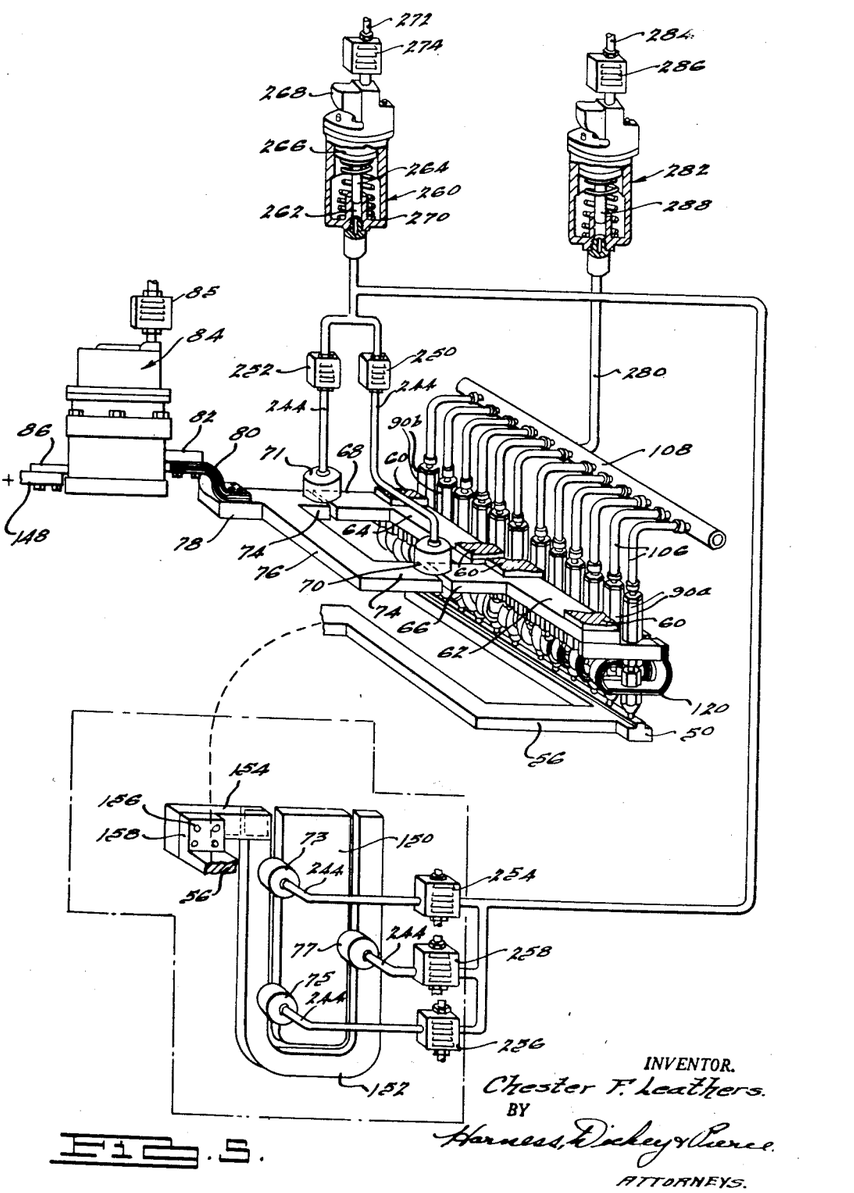
Fig. 5 is a diagrammatic view in perspective showing certain of the electrical and fluid circuits employed with the machine of Fig. 1.

The top structure 20 forms a rigid support for two pairs of longitudinally spaced downwardly projecting supporting brackets 60, one of which is shown in Figure 1, and all of which are fragmentarily shown in Figure 5. These brackets 60 form supports for, and are insulated from, corresponding bus bar sections 62 and 64. In the preferred practice of the present invention there is one such bus bar section which is individual to each group of welding guns, but which is common to all guns in a particular group. By way of illustration, the present welder is illustrated as being arranged to accommodate two groups and consequently only two bus bar sections 62—64 are shown. As is diagrammatically shown in Figure 5, bus bar sections 62 and 64 are each provided with lateral extensions 66 and 68 respectively, which are adapted to be selectively connected, by means of the hereinafter described secondary contactors 70 and 71, to the laterally extending portions 72 and 74 of a cooperating bus bar section 76. The terminal 78 of bus bar section 76 is rigidly secured by means of a usual flexible conductor section 80, to one terminal 82 of the hereinafter described main contactor 84. The other terminal 86 of this contactor is connected to the remaining terminal of the power pack 22.

The welding guns of the two groups are designated, respectively, as 90a and 90b, there being six guns in each group, although it will be understood that in practice each group may contain a different number of guns, depending upon the capacity of the power pack and depending further upon the current requirements of the individual welds which are made by the guns of the individual groups.

Figure 4:
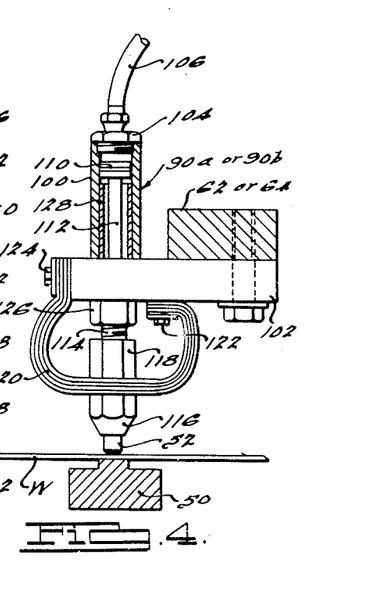
Fig. 4 is a view in section of one of the movable electrode assemblies.

Each gun, as clearly appears in Figure 4, comprises a cylinder 100, which is rigidly secured to the upper surface of a corresponding auxiliary bus bar section 102. Each cylinder 100 is closed at its upper end by means of a fitting 104, which accommodates a fluid supply line 106. As shown in Figure 5, the lines 106 are common to and are connected to a manifold 108, which is described hereinafter, serves as a source of supply to the actuating fluid, which is preferably oil. Each cylinder 100 slidably receives a piston 110, the piston rod 112 whereof freely passes through the corresponding auxiliary bus bar 102 and carries, at its lower end, a threaded enlarged portion 114. The corresponding movable electrode 116 is threaded on to the extension 114 and, in cooperation with an associated nut 118, serves to clampingly engage a flexible shunt 120, the respective ends whereof are secured to the bus bar 102 by studs 122 and 124. Each cylinder 100 is provided with a spacing sleeve 128 which limits the downward movement of the associated piston 110, and consequently of the associated electrode 52. Sleeve 128 is preferably so adjusted that when the work W is applied to the electrode 50, the upward movement of the table 30 brings the work into engagement with the point 52 and elevates the latter to approximately the position shown in Figure 4. At the time the table 30 is elevated, pressure is relieved from the line 106, so that such elevating movement of the point 52 does not involve the application of any substantial pressure between electrodes 50—52 and the work.

Each auxiliary bus bar 122 is rigidly secured to the corresponding secondary bus bar 62 or 64, it being appreciated that the individual bus bar 102 and the corresponding shunts 120, as well as the remaining bus bar features are so adjusted with respect to the current requirements of each weld and the resistance at each weld point, that the over all resistance of each branch welding circuit in each group is such that when the welding circuit is energized, each weld receives the desired quantity of current. These adjustments are, of course, determined by the character of the work, the thickness of the workpieces, and related well-known factors. It will be understood, too, that the bus bar sections are such that as large a proportion as is reasonably possible of the total resistance of each welding circuit is represented by the resistance at the junction between the workpieces.

Figure 2:
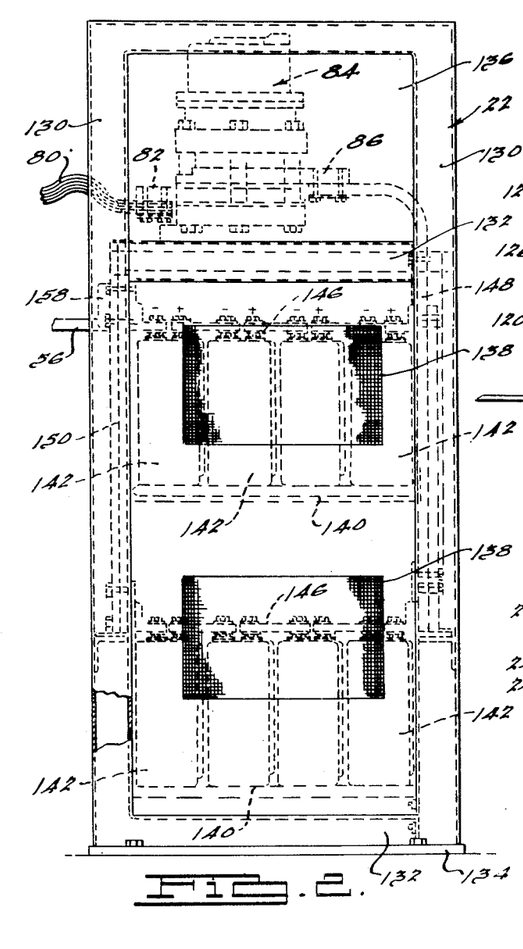
Fig. 2 is a view in side elevation of a battery unit which may be used in the practice of the invention.

Referring now to Figures 1 and 2, the battery unit or power pack 22 is illustrated as embodying the general construction described in more detail in the aforesaid copending application, Serial No. 435,322. More particularly, this unit comprises a generally rectangular frame structure which is defined by corner posts 130, cross members 132, and a base 134. The frame structure is provided with removable doors 136, at each side thereof, which doors may be provided with ventilating grills 138. The frame structure also supports a plurality of shelves 140 which individually support the corresponding cells b which comprise the battery unit. As will be appreciated, these individual cells may be arranged in various series, series-parallel, and parallel combinations, in accordance with the relative voltage and current requirements of the associated welding circuits. Intermediate bus bar connections between the individual cells are indicated at 146, all such connections of one polarity being electrically connected to a common bus bar 148 which is rigidly connected to the previously mentioned terminal 86 of the main contactor 84. The other terminal, for example, the negative terminal of the cell assembly is permanently connected to a vertically extending bus bar 150 which is rigidly supported at the side of the machine which is opposite the bus bar 148. As is diagrammatically shown in Figure 5, bus bar 150 lies between the legs of a heavy U-shaped conductor 152 which has a resistance which is relatively higher than that of bus bar 150. For example, member 152 may be formed of cast iron. Member 152 is also rigidly supported by the frame structure of the battery unit, and is provided with a laterally extending bus bar 154, which is rigidly connected by studs 156 to an upwardly directed terminal portion 158 which is provided at the end of the previously mentioned common bus bar 56 (Figure 5). If desired, the connection between bus bar portions 154 and 56 may include a flexible section such as the section 80, Figure 5.

A plurality of secondary contactors 73, 75, and 77 are provided to connect the bus bar 150 to the cooperating bus bar 152 at any of a plurality of points distributed along the length of the latter, so as to variably control the amount of the relatively high resistance bus bar which is included in the welding circuit.

Referring now particularly to Figure 6, the contactor 84 is illustrated as embodying the construction of said copending application, Serial No. 435,322, filed July 17, 1944. More particularly, the contactor comprises a pair of carbon disks 170 and 172 which are replaceably attached to cooperating supports 174 and 176. Support 176 is rigidly connected to, but is insulated from, the contactor base 178, by a plurality of circumferentially distributed studs 180. Support 174 in turn is rigidly secured to but is insulated from a cooperating pressure applying member 182 by means of a plurality of circumferentially distributed studs 184. A plurality of circumferentially spaced compression springs 186, the effect whereof may be varied by adjusting studs 188, act between the support 174 and the base 178, and continuously urge such support and the upper disk 170 to a position in vertically spaced relation to the lower carbon 172. A limit to such upward movement is afforded by the engagement between the top of the associated actuating piston 190 with the under side of a boss 192 formed in the associated cylinder 194.

The cylinder 194 is rigidly secured to the top of a cooperating housing member 196, and members 194 and 196 are supported in vertically spaced relation to the base 178 by a plurality of posts 198 and spacers 200. The housing 196 accommodates a plurality of circumferentially distributed bell crank levers 202 which are pivotally supported therein upon trunnions 204. The upper end of each lever 202 carries a periphery grooved roller 206 which cooperates with a cam 208 which is carried by the piston 190. The other arm of each bell crank is provided with a recess or pocket 210 which accommodates a pressure pin 212 which bears against the pressure member 182. Piston 190 is continuously urged to its elevated position by means of compression spring 214 which is seated between the piston and the base 216 of the housing 196. Spring 214 surrounds a post 218 which is fixed to the piston and is guided in a sleeved opening 220 in the base 216.

In operation, the parts normally occupy a position in which the carbons 170 and 172 are spaced apart as aforesaid. To close the contactor, an actuating fluid, such as air, is admitted to the chamber space 222, thereby forcing piston 190 downwardly against the action of springs 214 and 186. This downward movement of the piston causes a rocking movement of the bell cranks 202 and a consequent downward movement of the support 174 and its carbon 170. After the carbons 170 and 172 engage each other, thereby initially completing the circuit through the contactor, the pressure continues to build up in chamber 222, thereby increasing the pressure between the carbons and decreasing the resistance at the junction therebetween. This decrease causes the welding current to rise from an initial value to a maximum value. To open the contactor, the space above piston 190 is connected to exhaust so that the air is enabled to escape from the chamber space 222 at a controlled rate. The reduction in pressure acting against piston 190 progressively reduces the pressure between the carbons and ultimately enables springs 186 to separate the carbons, interrupting the circuit through the contactor. The rate of carbon-pressure decrease is preferably so related to the characteristics of the welding circuit as to cause the welding current to fall to a value which is a minor fraction of its maximum value, before the carbons separate.

Figure 3:
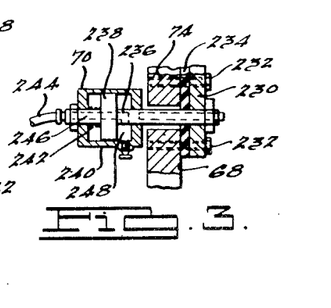
Fig. 3 is a view in vertical section, illustrating one of the secondary contactors which is preferably used in the practice of the invention.

Referring now to Figure 3, one of the previously mentioned secondary contactors 70, 71, 73, 75, and 77 is shown in detail. It will be appreciated that all of these contactors may be identically constructed so that a description of one contactor, No. 70, will suffice for all. Contactor 70 comprises a base plate 230 which is rigidly connected to the cooperating two bus bar sections 68 and 74, by studs 232. Insulation such as 234 is interposed in the just-mentioned connections, so that base 230 is electrically insulated from the bus bars 68 and 74. The piston rod 236 is rigidly connected to the base 230 and projects freely through the space between the bus bars 74 and 68. Piston rod 236 is connected to a piston 238 which is slidably received in an associated cylinder 240. A spring 242 surrounds the piston rod and continuously urges the cylinder 240 to a position in which it is spaced from the bus bars 74 and 68. A supply line 244 for an actuating fluid, preferably oil, is connected to the end of the piston rod so that actuating fluid can be admitted to the piston rod passage 246 into the chamber space 248. Such action causes the cylinder to bodily move along the rod and, by engaging the bus bars 68 and 74, to complete an electrical circuit therebetween.

It will be appreciated that the entire secondary contactor assembly is entirely supported by the associated bus bars. Opening and closing movements of the secondary contactors therefore do not stress or tend to bend or distort these bus bars. Separate mounting means for the secondary contactors are also dispensed with.

The supply lines 244 associated with the respective secondary contactors (Figure 5) lead, through associated individually operable two-way valves 250, 252, 254, 256, and 258, to a conventional pneumatic-hydraulic booster 260 which may and preferably does embody the construction described in Martin Patent No. 2,126,490, granted August 9, 1938. Briefly, this booster comprises a relatively small hydraulic cylinder 262, which receives a piston element 264, which in turn is connected to a larger piston 266, which is movable in a cylinder 268. Cylinder 268 is mounted upon a member 270 which serves as a reservoir for the cylinder 262. An elastic fluid such as air can be admitted to the space above piston 266, through line 272, which controlled by a usual electromagnetically operated three-way valve 274. When actuated, booster 260 actuates one or the other, or both, of the secondary contactors 70 and 71, depending upon the condition of valves 250 and 252. The condition of the secondary contactors 70 and 71 determines which of the groups of welding guns 90a or 90b receives welding current in response to closure of the main contactor 84.

The actuation of the booster 260 also actuates one of the current controlling secondary contactors 73, 75, and 77, depending upon the conditions of the valves 254, 256, and 258. As described above, secondary contactors 73, 75, and 77 determine what proportion of the relatively high resistance bus bar 152 is included in the welding circuit and consequently determine the magnitude of the current delivered to the active group or groups of welding guns.

The manifold 108, which serves as a source of supply for the individual welding guns is connected, through a line 280, with a booster 282 which may and preferably does duplicate the booster 260. Booster 282 is supplied through a line 284, under control of a usual electromagnetically operated three-way valve 286. It will be appreciated that when valve 286 is opened to admit air to the booster 282, the hydraulic piston 288 thereof forces oil through the line 280 and thence through the manifold 108 and the individual lines 106 into all of the welding guns 90a and 90b, thereby causing the corresponding movable electrodes to engage the work with a pressure suitable for welding. It is preferred to thus apply pressure to all of the electrodes at the same time.

It will be appreciated that in the broader aspects of the invention any of a wide variety of control systems may be utilized to provide for the proper operation of the main and secondary contactors and so as to insure the delivery of the proper amounts of welding current to the individual groups of electrodes. An illustrative control system is diagrammatically shown in Figure 7, in which the proper sequencing of the control valves referred to above is effected by utilizing a conventional weld timer 300 of the so-called pulsation type, and an indexing unit 302 of the electromagnetically controlled ratchet type. Timer 300 may be entirely conventional in arrangement and is consequently shown in outline only, it being understood that this timer may be energized by momentarily closing the illustrative pilot switch P. When so energized, the timer establishes an over-all welding period, during which all of the groups of electrodes are maintained in engagement with the work at the welding pressure, and during which these groups of electrodes are successively supplied with welding current. As diagrammatically shown, timer 300 includes a usual control relay CR1, having contacts designated a and b. Relay CR1 closes in response to closure of the pilot switch and remains closed until the completion of the welding period. Timer 300 also incorporates a control relay CR2 which opens and closes an adjustably predeterminable number of times during the welding period. This relay closes shortly after closure of relay CR1, and opens for the last time in the succession, shortly prior to the reopening of relay CR2. Relay CR1 is provided with a set of three contacts a, b, and c which open and close in the sequence indicated in the legends.

Figure 7:
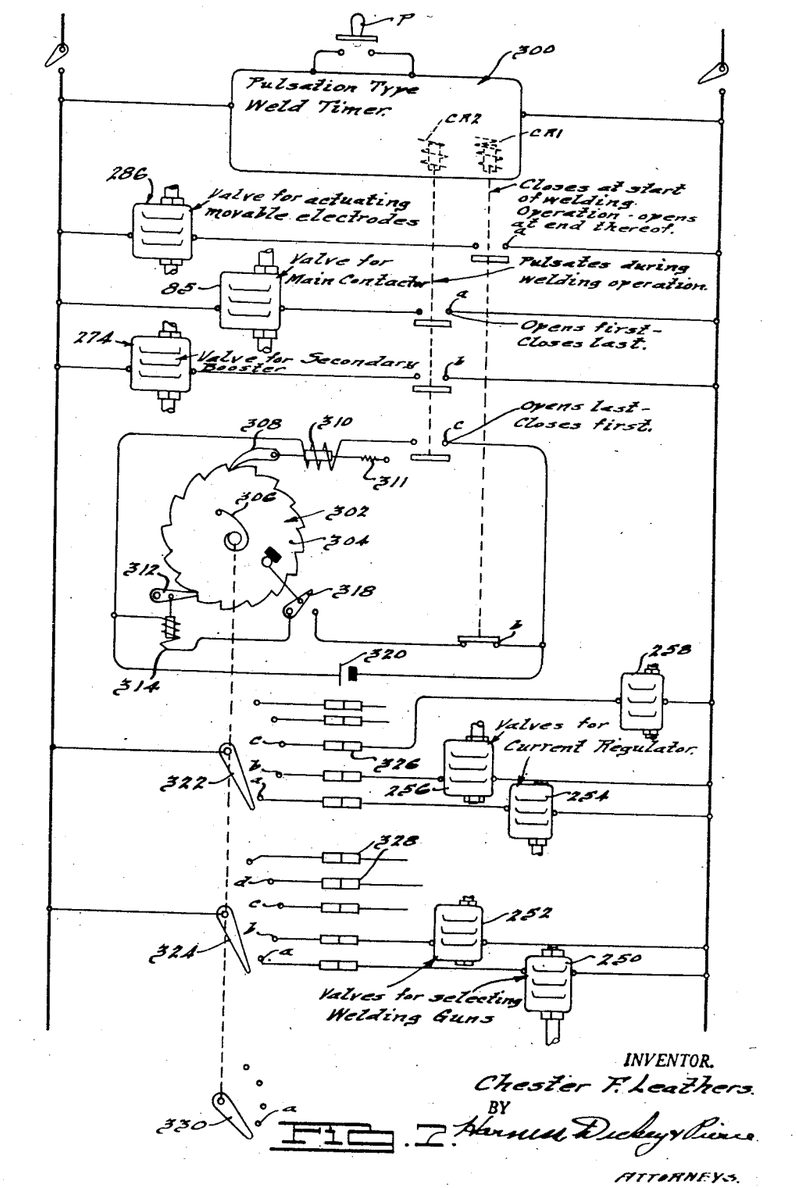
Fig. 7 is a diagrammatic showing of a control system that may be used with the system of Figs. 1 through 6.
Figure 10:
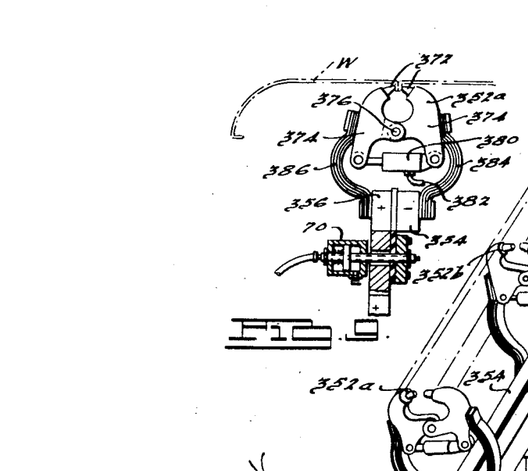
Figure 11:
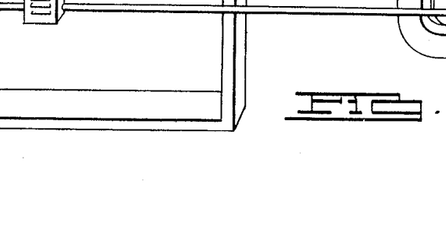

The indexing unit 302 comprises a toothed ratchet wheel 304 which is continuously biased to the illustrated position by means of a spiral spring 306, but which can be advanced in step by step fashion by an advancing pawl 308 which is connected to an armature actuated by the solenoid 310. A holding pawl 312 serves to hold the ratchet wheel in each of its successive advanced positions, but may be retracted to permit a return or resetting movement of the ratchet wheel, by energizing the associated solenoid 314. The circuit for solenoid 314 includes a limit switch 318, which is opened when the ratchet wheel is at its normal or reset position but is closed at all other times. A battery 320 serves as an illustrative source of power for solenoids 310 and 314.

The indexing wheel 304 drives a pair of commutator arms 322 and 324 which in the normal or reset position of the indexing unit, are out of cooperation with associated contacts a, b, and c, etc., and which are successively moved into engagement with such contacts as the indexing unit advances. Contacts a, b, and c associated with the commutator arms 322 and 324 are selectively connectable through usual plug and jack assemblies 326 and 328, to the previously mentioned valves associated with the current regulator 150—152 and with the valves which serve to select the groups of welding electrodes.

It is believed that the remaining details of the system of Figures 1 through 7 may best be understood from a brief description of the operation thereof.

Assuming it is desired to make a weld, the work may be introduced into the space between the common bus bar 50 and individual welding points 52. This is preferably done at a time when the table 30 is in its lowered position. After such placement, rams 34—44 may be actuated to elevate table 30 and lock it in its elevated position. The means for accomplishing this, being conventional, are not shown. The elevating movement of the table 30 brings bus bar 50 and the work to a position in which the electrodes 52 are lightly engaged therewith.

Thereafter, pilot switch P may be closed, energizing the weld timer 300. Such energization results in a prompt closure of control relay CR1, which thereupon closes its contact a and opens its contact b. The opening of contact b is without effect since the circuit for ratchet reset solenoid 314 is now interrupted at limit switch 318. Closure of contact a of relay CR1 completes an obvious energizing circuit for the winding (not shown) of the previously mentioned conventional three-way valve 286 associated with booster 282 (Figure 5). Upon being energized, valve 286 admits air to the booster 282, which thereupon applies a sufficient pressure to the oil in line 280, header 108, and the individual lines 106 to cause all of the welding guns 90a and 90b to press their associated movable electrodes 52 into engagement with the work at the welding pressure. This action serves to firmly locate the work in proper position for the welding operation.

At the expiration of an adjustable interval following closure of relay CR1, relay CR2 moves to the closed position. It will be understood that this interval may be a fixed interval, or it may be an interval which is determined by a usual pressure switch which responds to the pressure in, for example, the line 280. Upon being energized as aforesaid, relay CR2 successively closes its contacts c, b, and a. Closure of contact c completes an energizing circuit for solenoid 310 which thereupon advances pawl 308 and causes the ratchet wheel 304 to advance to a position in which commutator arms 322 and 324 are in engagement respectively with their associated terminals a. Such commutator movements complete obvious energizing circuits for the previously mentioned valves 254 and 250. These valves are of usual normally closed construction which are open when and so long as the associated electromagnets are energized. The opening of valve 250 (Figure 5) connects booster 260 to secondary contactor 70 associated with the group of welding guns 90a. The opening of valve 254 connects booster 260 to the secondary contactor 73 associated with the current regulator 150—152. It will be noticed that as shown this secondary contactor is in such a position that only a very small amount of the bus bar 152 is included in the welding circuit. The actuation of secondary contactor 73 thus establishes a relatively low resistance welding circuit, appropriate to the delivery of a relatively high value of welding current to guns 90a.

Shortly after the above described actuations of secondary contactors 70 and 73, contacts b of relay CR2 close, completing an obvious energizing circuit for valve 274 associated with booster 260. Upon being energized, valve 274 admits air to the booster 260, causing a delivery of oil from cylinder 262, through the now open valves 250 and 254, into secondary contactors 70 and 73, thereby causing these contactors to close and prepare the aforesaid selecting and current regulating circuits.

At the expiration of an interval following the actuation of booster 260, which is sufficient to insure closure of contactor 70 and 73, contact a of relay CR2 closes, completing an obvious energizing circuit for valve 85 associated with the main contactor 84. Upon being so energized, valve 85 admits air to the chamber 222 associated with the main contactor 84 (Figure 6) and causes the previously described closing and resistance decreasing action thereof. This action initiates a flow of welding current from the battery unit 22 through contactor 84, bus bars 76 and 62, the flexible connectors 120 associated with the individual guns 90a, electrodes 52, the work, bus bars 50, 56, and 154, a portion of bus bar 152, and bus bar 150 back to the battery unit.

At the expiration of the time interval established by timer 300, relay CR1 resumes the illustrated open position, successively reopening contacts a, b, and c. The reopening of contact a deenergizes valve 85, thereby causing the main contactor 84 to reopen, interrupting the flow of welding current. After a short interval sufficient to insure the complete opening of contactor 84, contact b of relay CR2 reopens, interrupting the circuit for valve 274 associated with booster 260. This action relieves the hydraulic pressure applied to secondary contactors 70 and 73 and enables the associated return springs 242 (Figure 3) to open these contactors.

At the expiration of a short interval, sufficient to permit the complete opening of the secondary contactors 70 and 73, contact c of relay CR2 reopens deenergizing solenoid 310 and enabling its associated spring 311 to pull it back to a position in which it engages behind the next succeeding ratchet tooth, preparatory to the next indexing operation.

At the expiration of the "off" period for relay CR2 determined by timer 300, this relay recloses, duplicating the operations previously described with the exception that in this case the energization of ratchet solenoid 310 causes the indexing unit to advance the commutator arms 322 and 324 into engagement with the associated terminals b. This indexing movement deenergizes valves 250 and 254, permitting them to reclose; and energizes valves 252 and 256, associated respectively with secondary contactors 71 and 75. It will be appreciated that the plug and jack connections 326 and 328 enable the control valves to be connected to desired ones of the commutator terminals. For example, terminal b of commutator 322 may, if desired, be arranged to energize valve 258 instead of valve 256. In Figure 5, as will be evident, valve 256 establishes a higher value of welding current than does valve 258.

The remaining operations are the same as those described above, with the exception that in this case, the now closed contactor 71 causes the welding current to be delivered to the group of welding guns 90b and valve 256 establishes a somewhat lower value of welding current than was established for welding guns 90a in the preceding operation.

In the present simplified showing, it is assumed that the same period of current flow is appropriate for both groups of guns 90a and 90b. If desired, the indexing unit 302 may be provided with an additional commutator arm 330, the associated terminals a, b, etc., whereof are associated with the timer 300 in such relation as to establish "on" periods for relay CR2 corresponding to each position of the commutator. Such adjusting circuits being conventional, are not shown.

In the present system also only two groups of welding guns 90a and 90b are illustrated. Consequently, timer 300 is set so as to limit the successive "on" periods of relay CR2 to two such periods and the over all welding period is set so as to cause relay CR1 to resume the de-energized position shortly after the conclusion of the second "on" period for relay CR2.

Following the above described resetting operations which result from the de-energization of relay CR2 accordingly, relay CR1 resumes the de-energized position, opening its contacts a and reclosing its contacts b. The reopening of contacts a de-energizes valve 286 associated with booster 282, relieving the pressure on the electrodes 52. Reclosure of contact b of relay CR1 completes an energizing circuit for solenoid 314 associated with the reset pawl 312. This action withdraws the reset pawl from cooperative engagement with the ratchet teeth, enabling the return spring 306 to promptly restore the ratchet wheel to its starting position. When the starting position is reached, limit switch 318 reopens, interrupting the reset circuit. During the return movement of the ratchet wheel, all associated commutator arms sweep back across all of the contacts which they have previously engaged. Such return sweep completes momentary energizing circuits for the associated valves and for the elements associated with arm 330. Such energizing circuits are, however, without effect since all other parts of the system are now in a normal or de-energized condition.

The modified embodiment of the invention shown in Figures 8 and 9 illustrate the adaptability of the invention to differing types of workpieces and to differing types of welding guns. Figures 8 and 9 also illustrate the use of a motor driven pump unit 350 as a source of power for actuating the various groups of welding guns, instead of the booster unit 282 of Figure 5.

In Figures 8 and 9, three groups of welding guns 352a, 352b, and 352c are provided for. The bus bar arrangement accordingly includes a common bus bar 354 and individual electrically separate bus bars 356, 358, and 360. These individual bus bars are arranged to be selectively connected by secondary contactors 70, 71, and 71', to a common bus bar 362 which is connected, through the main contactor 84, and the regulator 150—152, to one terminal of the battery unit 22. The other common bus bar 354 is directly connected to the other terminal of the battery unit 22. It will be understood that bus bar sections of respectively opposite polarity are suitably insulated from each other, as indicated by the insulation 370.

In this instance also the indicated guns 352a are of the usual pinch gun type, having a pair of weld points 372, carried by arms 374 which are pivotally interconnected, but are insulated from each other, by a pin 376. Each gun is provided with a ram 380 which, when supplied with fluid, such as oil, through an associated line 382, causes the points 372 to clamp the work W therebetween. When such hydraulic pressure is released, points 372 are caused to separate, either under the influence of a usual return spring (not shown) associated with the ram 380, or under the influence of the associated flexible supporting bus bars 384 and 386, which as shown, constitute the sole means for supporting each associated gun upon the associated bus bars 354 and 356. Each supply line 382 is connected to a header 390 which in turn is connected to the pump 351.

The control system described in connection with Figures 1 through 6 may, of course, be utilized in connection with the operation of Figures 8 and 9 with the exception that contact a of relay CR1, instead of controlling a booster valve 286, will be arranged to control the operation of the pump 351 so as to cause the closing and opening operations of the individual guns 352a, etc.

It will be appreciated from the foregoing that the present invention provides very flexible multiple spot welding systems which, in the first instance, enable the energy from a single storage battery unit to be simultaneously delivered to a plurality of welding points, and enable successive flows of welding current to be delivered to successive groups of guns. In practice, battery charging mechanism is usually continuously connected to the battery unit, so that the energy in each weld is derived in major part from the battery unit, and in minor part from the source. Energy taken from the battery unit during each weld is returned thereto during the intervals between the welds. Since the major part of the energy for each weld is derived from the battery unit, the current demand from the line associated with the charger is very light. Consequently, each gun of a group may be supplied with a relatively high value of welding current without imposing undue demands on the line supplying the charger. This factor materially reduces power costs, and the ability to make a plurality of welds similarly materially increases production rates.

Although only several specific embodiments of the invention have been described in detail, it will be appreciated that various further modifications in the form, number, and arrangement of the parts may be made without departing from the spirit and scope of the invention.

What is claimed is:

1. In a system for supplying power to a high current and low voltage load circuit unidirectional substantially non-pulsating voltage supplying means for supplying current to said circuit, means including at least a pair of bus bar sections for connecting said voltage supplying means to said circuit, and contactor mechanism supported entirely by said bus bar sections for making and interrupting an electrical connection between said sections.

2. In a high amperage low voltage electrical system, a plurality of energy using elements, each element being disposed to receive a pulse of current of predetermined magnitude, a source of unidirectional substantially non-pulsating voltage common to said elements for supplying low voltage high amperage current, circuit connections interposed between said source and said elements and including a circuit portion common to said elements and a plurality of branch circuit portions which correspond respectively to said elements, and contactor mechanism for controlling flow of current from said source to said elements, said contactor mechanism including a contactor common to said elements and interposed in said common circuit portion, and a plurality of contactors individual respectively to said elements and interposed respectively in the corresponding branch portion.

3. The system of claim 2 including means operable, in causing the transmission of pulses of current through said elements, to first close the individual contactor corresponding to a particular element and to thereafter close the common contactor.

4. In a high amperage low voltage electrical system, a plurality of groups of energy using elements, each group containing a plurality of elements and each element being disposed to transmit a pulse of current of predetermined magnitude, a source of unidirectional substantially non-pulsating voltage to said groups for supplying low voltage high amperage current, circuit connections interposed between said source and said elements and including a circuit portion common to said groups and a plurality of branch circuit portions which correspond respectively to said groups, and contactor mechanism for controlling flow of current from said unit to said elements, said contactor mechanism including a contactor common to said elements and interposed in said common circuit portion, and a plurality of contactors individual respectively to said elements and interposed respectively in the corresponding branch portion.

5. The system of claim 2 including means operable, in causing the transmission of pulses of current through said groups, to first close the individual contactor corresponding to a particular group and to thereafter close the common contactor.

CHESTER F. LEATHERS.

REFERENCES CITED

The following references are of record in the file of this patent:

UNITED STATES PATENTS

| Number | Name | Date |
| --- | --- | --- |
| 1,122,665 | Thomson | Dec. 29, 1914 |
| 1,183,264 | Woodrow | May 16, 1916 |
| 1,189,584 | Kicklighter | July 4, 1916 |
| 1,754,948 | Hatch | Apr. 15, 1930 |
| 2,097,377 | Martin | Oct. 26, 1937 |
| 2,194,687 | Biederman | Mar. 26, 1940 |
| 2,295,925 | Biederman et al. | Sept. 15, 1942 |
| 2,340,860 | Bragg | Feb. 8, 1944 |